United States Patent [19]

Vikis

[11] 4,374,010
[45] Feb. 15, 1983

[54] PHOTOCHEMICAL SEPARATION OF ISOTOPES

[75] Inventor: Andreas C. Vikis, Orleans, Canada

[73] Assignee: Canadian Patents & Development Limited, Ottawa, Canada

[21] Appl. No.: 7,708

[22] Filed: Jan. 30, 1979

[51] Int. Cl.$^3$ ............................................. B01D 59/00
[52] U.S. Cl. ............................................. 204/157.1 R
[58] Field of Search ................................. 204/157.1 R

[56] References Cited

PUBLICATIONS

Rommel, H., "The Photodecomposition of Carbon Monoxide in the Far Ultraviolet", Bonn. Univ., (W. Ger.), Contract AF 61 (052), 381, (1967).
Zare, R. N., "Laser Separation of Isotopes", Scientific American, 236:86–98, Feb., 1977.
Moore, C. B., "The Application of Lasers to Isotope Separation", Acc. Chem. Res., 6:323–328, 1973.
Letokhov, V. S., "Laser Separation of Isotopes", Ann. Rev. Phys. Chem., 28:133–159, 1977.
Dunn, D. et al., "Isotopic Enrichment of Carbon-13 and Oxygen-18 in the Ultraviolet Photolysis of Carbon Monoxide", J. Phys. Chem., 77(7):878–883, 1973.

Primary Examiner—Deborah L. Kyle
Attorney, Agent, or Firm—Alan A. Thomson

[57] ABSTRACT

A method for photochemical separation or enrichment of isotopes of carbon-13 and oxygen-18 employing 123.58 nm resonance radiation of Kr of selected bandwidth and degrees of self-absorption in order to excite selectively to the $A^1\pi v'=13$ state, $^{13}C^{16}O$, $^{12}C^{18}O$, or both $^{13}C^{16}O$ and $^{12}C^{18}O$ simultaneously, in a mixture of isotopic CO molecules where the $^{12}C^{16}O$ isotopic molecule is in a large excess. The electronically excited isotopic CO molecules react with a second reactant to yield isotope enriched final products which can be separated; for example, ground state CO as second reactant yields $CO_2$ and $C_3O_2$ products.

9 Claims, No Drawings

PHOTOCHEMICAL SEPARATION OF ISOTOPES

This invention is concerned with the isotopic enrichment of carbon-13 and oxygen 18 by the selective photolysis of isotopic species of carbon monoxide.

There have been several attempts and proposals in the literature for photochemically enriching isotopes of the various elements. The bulk of these employ laser radiation because of its monochromaticity and intensity.

Most relevant to the subject at hand is the work of C. B. Moore and E. S. Yeung, U.S. Pat. No. 3,983,020, Sept. 28, 1976; and J. Marling in Journal Chem. Phys. 66(1977) 4200. Photochemical enrichment of isotopes of hydrogen (H, D), carbon ($^{12}C$, $^{13}C$, $^{14}C$), and oxygen ($^{16}O$, $^{17}O$, $^{18}O$) was accomplished by these researchers employing ultraviolet laser radiation in order to selectively excite isotopic molecules of formaldehyde. O. Dunn, P. Harteck and S. Dondes, J. Phys. Chem. 77(1973)878 have previously employed the 206.24 nm resonance radiation of iodine which excited selectively $^{13}C^{16}O$ and $^{12}C^{18}O$ to the $a^3\pi$ state. Isotopically enriched products have been reported, by the above authors; however, the optical metastability of the $a^3\pi$ state and the low inherent selectivity of the excitation, render this of little practical significance.

In the present invention, a simple nonlaser light source is shown to be effective in photochemically enriching isotopes of carbon-13 and oxygen-18 from their natural abundance in CO (1.1% carbon-13, 98.4% carbon-12, 0.2% oxygen-18, 99.8% oxygen-16).

The photolysis of carbon monoxide with the 123.58 nm radiation has been studied previously by K. H. Becker and K. H. Welge, Z. Naturforsch. 20, 1692 (1965); and by H. J. Rommel, U.S. Clearinghouse Fed. Sci. Tech. Inform. 1967, AD664934; U.S. Government Res. Develop. Rep. 68, 71(1968). No isotopic enrichment was observed by either group in these studies. A re-examination of the work of the above authors in the light of the present research indicates that no effort was exercised by the above authors in controlling the frequency band-width of the 123.58 nm radiation of Kr. Such band-width control is now known to be critical for isotope selective photolysis in this system.

The present invention employs judiciously selected line shapes of the 123.58 nm resonance radiation of Kr, obtained from a gaseous discharge containing Kr and inert gas such as He in various proportions and pressures, in order to excite selectively $^{13}C^{16}O$, $^{12}C^{18}O$, or both, to the $A^1\pi v'=13$ state with no significant excitation of the most abundant isotopic molecule of $^{12}C^{16}O$. The excited isotopic molecules react with ground state CO to yield $CO_2$ and $C_3O_2$ final products which are enriched in the preselected isotope. The isotope enriched products are removed from the reactants by condensation at the temperature of liquid nitrogen (−196° C.).

The invention is basically a process for the photochemical separation of at least one of the isotopes carbon-13 and oxygen-18 comprising:

(a) irradiating carbon monoxide with selected bandwidths of 123.58 nm resonance radiation of krypton to selectively excite at least one of $^{13}C^{16}O$ and $^{12}C^{18}O$ species without significant excitation of $^{12}C^{16}O$, (b) permitting reaction of the excited carbon monoxide species with a second reactant to occur, the reaction product being enriched in at least one of carbon-13 and oxygen-18, and (c) separating the isotopically-enriched products from the reaction.

The high resolution absorption spectra of the $A^1\pi-X^1\Sigma+$ (13,0) band of $^{13}C^{16}O$, $^{12}C^{18}O$, and $^{12}C^{16}O$ are shown in FIG. 2 in A. C. Vikis, J. Chem. Phys. 69, 697(1978). The 123.58 nm resonance radiation of Kr was superimposed on these spectra for comparison. The frequency differences between the center of the 123.58 nm radiation and the centers of the various rotational transitions of $^{13}C^{16}O$, $^{12}C^{18}O$, and $^{12}C^{16}O$ are compared in Table 1.

Under ideal conditions the line widths (frequency spread) of the various rotational lines of CO is 0.19 cm$^{-1}$ (Doppler width) and the line width of the 123.58 nm radiation is 0.11 cm$^{-1}$ (Doppler width). Therefore, only a weak overlap of the 123.58 nm radiation with the Q(13) absorption line of $^{13}C^{16}O$ is possible. The absorption line widths of CO under limited conditions of temperature and pressure and in the absence of electric or magnetic fields do not deviate substantially from ideality. However, varying line shapes of the 123.58 nm radiation emanating from a discharge can be obtained depending on the type of discharge, electric field strength, its temperature, pressure, and gas composition. Two such line shapes, which were judiciously selected for their effective overlap with the desired isotopic molecules of CO, namely $^{13}C^{16}O$ and $^{12}C^{18}O$, are shown in FIG. 3 in A. C. Vikis, J. Chem. Phys. 69, 697(1978). The sharp and unreversed ($\Delta v_{\frac{1}{2}} \doteq 0.1-3$ cm$^{-1}$) 123.58 nm radiation obtained for example from a 2450 MHz microwave discharge in 12–13% Kr in He at a total pressure of 1 Torr, was found especially effective in selectively exciting only $^{13}C^{16}O$. The broad $\Delta v_{\frac{1}{2}} \leq 15$ cm$^{-1}$ and self-absorbed (dip in the center) 123.58 nm radiation obtained from a 2450 MHz microwave discharge in 100% Kr at a total pressure of 1.6 Torr, was found very effective in selectively exciting only $^{13}C^{16}O$ and $^{12}C^{18}O$. It should be noted that the efficiency of the latter radiation in exciting $^{13}C^{16}O$ was lesser than that of the first radiation because of the self-absorption of the latter.

Excitation of the given isotopic molecule and the given rotational transition is verified by the resonance fluorescence spectra shown in FIGS. 4–6 in A. C. Vikis, J. Chem. Phys. 69, 697(1978).

It should be noted that successful selective excitation of the various isotopic molecules of CO does not only depend on the line shape of the Kr resonance radiation, but also on the purity of the KR resonance radiation emitted from the discharge. This purity is essential, especially with respect to the CO $A^1\pi-X^1\Sigma+$ (v',0) resonance radiation (commonly called CO 4th positive group radiation) which is often encountered in such discharges. The latter radiation contains isotopic components in proportion to the natural isotopic abundance and would therefore excite $^{12}C^{16}O$, $^{13}C^{16}O$, and $^{12}C^{18}O$ with no isotopic selectivity whatsoever. Gettering the lamp with barium or titanium, and frequent monitoring of the purity of the lamp emission, as was done in the present experiments, is paramount.

The above described spectroscopic data demonstrate that, provided the excited electronic state of carbon monoxide is reactive and yields products that can be separated from CO by a physical or chemical principle, the following isotopic separations can be accomplished as follows:

I. Mixture of:

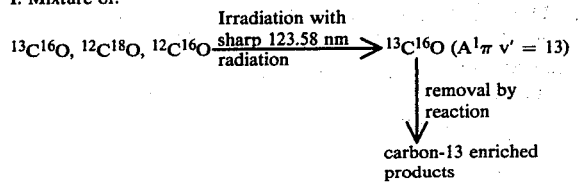

II. Mixture of:

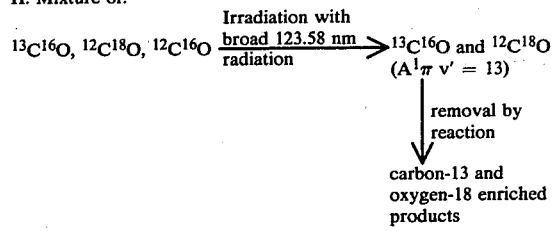

III. Mixture of:

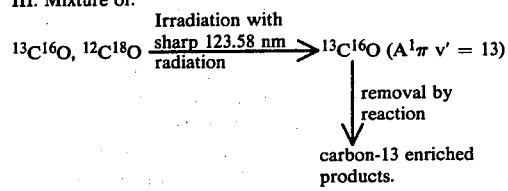

A demonstration of the feasibility of such an isotope enrichment scheme is given below.

Electronically excited CO reacts with ground state CO yielding $CO_2$ and $C_3O_2$ as final products. The mechanism of this reaction as it applies to separation of carbon-13 and oxygen-18 is as follows:

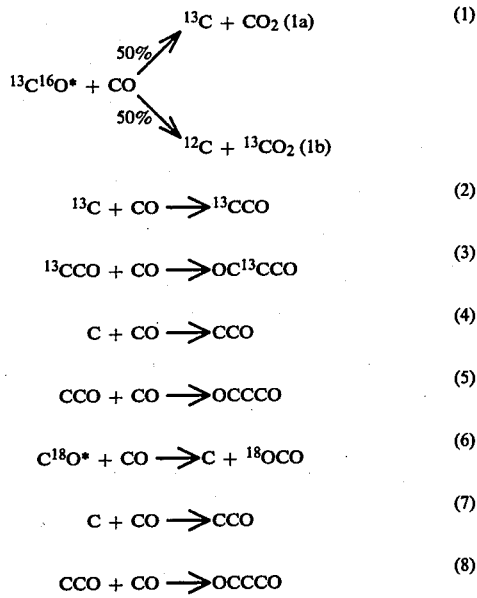

In the above mechanisms (*) denotes the electronic excitation, and C and O denote carbon and oxygen isotopes at their ground state isotopic abundance. In the case of enrichment of carbon-13 and oxygen-18 from natural isotopic abundance CO, C and O are for most practical purposes carbon-12 and oxygen-16.

The final yield of $CO_2$ and $C_3O_2$ per mole of 123.58 nm photons is approximately 0.02.

On the basis of the above mechanism, carbon-13 can be enriched up to 50% in $CO_2$ and up to 50% in the central carbon atom of $C_3O_2$ (17% when all carbons of $C_3O_2$ are considered). Enrichment in the central carbon of $C_3O_2$ is emphasized here because this carbon can be retrieved from $C_3O_2$, without loss in enrichment, employing standard techniques. In the case of oxygen-18, which ends up in $CO_2$ up to 50% enrichment is predicted.

It should be pointed out here that the above enrichment limits are determined by the nature of the scavenger, ground state CO in this case, which contains unenriched carbon and oxygen. The electronic excitation method was shown earlier to be capable of 100% enrichment provided that a scavenger containing no carbon in the case of carbon-13 enrichment, or oxygen in the case of oxygen-18 enrichment, can be found.

The enrichment data in Tables 2 and 3 show that close to the maximum possible enrichment is obtained in $C_3O_2$. The lesser enrichment in $CO_2$ is a result of dilution of the product $CO_2$ with $CO_2$ impurities present in the reactant CO. An additional source of unenriched $CO_2$ comes from the reaction of oxygen atoms with CO. Oxygen atoms are generated by the photolysis of $O_2$ impurities in the reactant CO. The above sources of impurity $CO_2$ diluted substantially the oxygen-18 enrichment in $CO_2$ and data on the latter were rather erratic. Oxygen-18 enrichments in $CO_2$ up to seven-fold have, however, been obtained in some cases where special attempts to minimize the above sources of impurities were made.

The photolysis experiments described here were performed at room temperature ($22\pm1°$ C.) in a cylindrical reaction cell made out of Pyrex (Trademark) glass. The reaction cell was 37 cm long, and 1.8 cm i.d. and was maintained at room temperature. The cell also served as one of the two vertical arms of a thermosiphon pump which circulated the reactants through the cell. The other vertical arm was cooled with liquid nitrogen ($\sim196°$ C.). The $CO_2$ and $C_3O_2$ reaction products were continuously removed by condensation on the inner walls of the latter arm. The 123.58 nm radiation was coupled into the reaction cell through a 1 mm thick $MgF_2$ window attached on one end of the cell. Following the photolysis, which lasted from two to four hours, the unreacted CO was pumped off and the $CO_2$ and $C_3O_2$ products were warmed to room temperature and transferred to the mass spectrometer sampler for analysis. An AEI Series QUAD 250A quadrupole mass spectrometer was employed.

Instead of reaction of the excited CO with carbon monoxide, other reactants can be used such as hydrogen, halogen, gaseous hydrocarbons, oxygen, etc. The excited CO is very reactive and many such reactions can occur.

Additionally, it was discovered that energy transfer from $Kr(^3P_1)$ to CO is also isotope selective, exciting preferentially $^{13}C^{16}O$ and $^{12}C^{18}O$ rather than $^{12}C^{16}O$ [A. C. Vikis, Chem. Phys. Letters 57, 522(1978)]. Thus an alternate process of selective excitation can be followed. Small partial pressures of Kr (such as about 0.2 Torr or less) in the presence of the isotopic mixture of carbon monoxide would absorb the 123.58 nm radiation and be raised to the $Kr(^3P_1)$ state which in collision with CO would excite preferentially the $^{13}C^{16}O$ and $^{12}C^{18}O$ molecules, which subsequently react as in the direct photolysis method.

TABLE 1

Near Resonance transitions of $^{12}C^{16}O$, $^{13}C^{16}O$ and $^{12}C^{18}O$ with the 123.58 nm radiation of krypton

| Rot. Lines in Absorption $(X^1\Sigma^+ \; v'' = 0 \rightarrow A^1 13\pi \; v' \rightarrow 13)$ | $\Delta\bar{\nu}$ (cm$^{-1}$)$^{a,b}$ | Rot. Lines in Emission $(A^1\pi \; v' = 13 \rightarrow X^1\Sigma^+ \; v'')$ |
|---|---|---|
| $^{13}C^{16}O$ A—X (13,0) | | |
| Q(13) | −0.4 | Q(13) |
| P(11) | −3.4 | P(11); R(9) |
| R(15) | −5.2 | P(17), R(15) |
| $^{12}C^{18}O$ A—X (13,0) | | |
| P(9) | −8.8 | P(9), R(7) |
| Q(11) | −6.2 | Q(11) |
| R(14) | 4.4 | P(16), R(14) |
| P(10) | 6.1 | P(10), R(8) |
| Q(12) | 8.7 | Q(12) |
| $^{12}C^{16}O$ A—X (13,0) | | |
| R(27) | — (5.6) | P(29), R(27) |
| P(23) | 6.0 (5.2) | P(23), R(21) |
| Q(25) | 9.4 (9.2) | Q(25) |

$^a\Delta\bar{\nu} = \bar{\nu}_{Kr} - \bar{\nu}_{CO}; \; Kr\, 80916.76 \; cm^{-1}$ $^b$The estimated error is ±0.2 cm$^{-1}$. The $^{12}C^{16}O$ data in parenthesis are from J. D. Simmons, A. M. Bass and S. G. Tilford, Astrophys. J. 155, 345 (1969).

TABLE 2

Carbon-13 Relative Abundance in the $CO_2$ and $C_3O_2$ Products$^{a,b}$

| Reactant CO Pressure (Torr) | Product $^{13}CO_2$ | Product $OC^{13}CCO$ |
|---|---|---|
| 23 | 14 | 69 |
| 31 | 7.2 | 58 |
| 34.5 | 15 | 71 |
| 35.2 | 11 | 60 |
| 37 | 4.7 | 59 |
| 50 | 15.9 | 64.7 |
| 69 | 8.1 | 62 |
| 118 | 9.1 | 51 |

$^a$Natural isotopic abundance CO (1.1% carbon-13) was employed in these runs.

$^b$The relative abundance of $^{12}CO_2$ and $^{12}C_3O_2$ is equal to 100. In the case of $C_3O_2$ enrichment of the central carbon atom is considered; total enrichment in $C_3O_2$ may be obtained by dividing the relevant values by three.

TABLE 3

| Product Carbon-13 Carbon-13 Reactant CO | Relative Abundance vs Reactant Relative Abundance$^{a,b}$ Products | | | |
|---|---|---|---|---|
| | $^{13}CO_2$ | $^{13}C^{12}C_2O_2$ | $^{13}C_2{}^{22}CO_2$ | $^{13}C_3O_2$ |
| 1.1 | 15.9 | 66.7 | ~0 | ~0 |
| 2.34 | 22.2 | 70.1 | 6 | ~0 |
| 5.02 | 28.9 | 78.6 | 11.6 | ~0 |
| 8.98 | 23.5 | 93.4 | 16.2 | ~0 |
| 11.7 | 27.6 | 104 | 24.0 | ~0 |
| 14.8 | 41.4 | 112 | 31.9 | 5.2 |
| 29.5 | 42.6 | 166 | 77.0 | 15.8 |

$^a$The total reactant CO pressure was 50 ± 1 Torr for all of the above runs.

$^b$The relative abundance of $^{12}CO_2$ and $^{12}C_3O_2$ is equal to 100.

I claim:

1. A process for the photochemical separation of at least one of the isotopes carbon-13 and oxygen-18 comprising:
   (a) irradiating carbon monoxide with selected bandwidths of 123.58 nm resonance radiation of krypton to selectively excite at least one of $^{13}C^{16}O$ and $^{12}C^{18}O$ species without significant excitation of $^{12}C^{16}O$, said band-width being selected from
      (i) the slightly broadened and reversed krypton 80916.76±15 cm$^{-1}$ radiation, which excites both $^{12}C^{18}O$ and $^{13}C^{16}O$, and
      (ii) the moderately sharp krypton line 80916.76±3 cm$^{-1}$ which excites only $^{13}C^{16}O$,
   (b) permitting reaction of the excited carbon monoxide species with a second reactant to occur, the reaction product being enriched in at least one of carbon-13 and oxygen-18, and
   (c) separating the isotopically-enriched products from the reaction.

2. The process of claim 1 wherein the selected bandwidth portion of krypton resonance radiation is the slightly broadened and reversed krypton 80916.76±15 cm$^{-1}$ radiation, which excites both $^{12}C^{18}O$ and $^{13}C^{16}O$.

3. The process of claim 1 wherein the selected bandwidth portion of krypton resonance radiation is the moderately sharp krypton line 80916.76±3 cm$^{-1}$ which excites only $^{13}C^{16}O$.

4. The process of claim 1 wherein the second reactant is carbon monoxide.

5. The process of claim 3 wherein the krypton lamp gas comprises krypton and helium, the gas pressures being within the ranges 0.12 to 0.14 Torr krypton and 0.86 to 0.88 Torr helium.

6. The process of claim 2 wherein the krypton lamp pressure is 1.6 Torr krypton.

7. The process of claim 1 wherein the carbon monoxide contains krypton, the krypton becoming excited on irradiation and by energy transfer preferentially exciting $^{13}CO$ and $C^{18}O$ molecules.

8. The process of claim 7 wherein the partial pressure of krypton is about 0.2 Torr.

9. The process of claim 4 wherein the CO pressure is within about 23 to about 118 torr.

* * * * *